(12) United States Patent
Remillieux et al.

(10) Patent No.: US 11,709,093 B1
(45) Date of Patent: Jul. 25, 2023

(54) THREE-DIMENSIONAL BROADBAND NONLINEAR PHASED ARRAY IMAGING

(71) Applicants: Triad National Security, LLC, Los Alamos, NM (US); Tohoku University, Sendai (JP)

(72) Inventors: Marcel Remillieux, Los Alamos, NM (US); Yoshikazu Ohara, Tokyo (JP)

(73) Assignees: Triad National Security, LLC, Los Alamos, NM (US); Tohoku University, Sendai (JP)

( * ) Notice: Subject to any disclaimer, the term of this patent is extended or adjusted under 35 U.S.C. 154(b) by 432 days.

(21) Appl. No.: 17/034,881

(22) Filed: Sep. 28, 2020

Related U.S. Application Data

(60) Provisional application No. 62/924,463, filed on Oct. 22, 2019.

(51) Int. Cl.
*G01H 9/00* (2006.01)
*G01B 11/25* (2006.01)
*G01N 29/04* (2006.01)
*G01N 29/24* (2006.01)
*G01N 29/06* (2006.01)

(52) U.S. Cl.
CPC .............. *G01H 9/004* (2013.01); *G01B 11/25* (2013.01); *G01H 9/008* (2013.01); *G01N 29/043* (2013.01); *G01N 29/069* (2013.01); *G01N 29/2418* (2013.01)

(58) Field of Classification Search
CPC ......... G01H 9/004; G01B 11/25; G01H 9/008; G01N 29/043; G01N 29/069; G01N 29/2418
USPC ........................................................ 73/598
See application file for complete search history.

(56) References Cited

U.S. PATENT DOCUMENTS 6,128,092 A * 10/2000 Levesque et al. ... G01S 15/8997
356/451
10,126,274 B2 * 11/2018 Hall et al. .......... G01N 29/4472
(Continued)

OTHER PUBLICATIONS

Blouin, et al., "Improved resolution and signal-to-noise ratio in laser-ultrasonics by SAFT processing," *Optics Express* 2(13):531-539 (Jun. 22, 1998).
Drinkwater, et al., "Ultrasonic arrays for non-destructive evaluation: A review," *NDT & E International*, 39(7):525—541 (Oct. 2006).
Lévesque, et al. "Inspection of thick welded joints using laser-ultrasonic SAFT," *Ultrasonics*, 69:236-242 (Jul. 2016).
(Continued)

*Primary Examiner* — Jacques M Saint Surin
(74) *Attorney, Agent, or Firm* — Klarquist Sparkman, LLP

(57) ABSTRACT

System include an ultrasonic transducer configured to couple to a nondestructive testing (NDT) sample and configured to produce and direct an ultrasonic probe wave at a selected frequency into a subsurface region of the NDT sample, a 3D laser scanning vibrometer configured to direct a detection beam in a scan area on a surface of the NDT sample and to receive a return beam from the scan area, and to detect, based on the return beam, a 3D motion of the surface across a wideband frequency range, and a processor, and a memory configured with instructions that, when executed by the processor, cause the processor to produce sub-surface image data of the NDT sample at multiple harmonics of the selected frequency in the wideband frequency range based on the detected 3D surface motion, wherein the sub-surface image data describes a nonlinear defect response produced in the NDT sample by interaction of the ultrasonic probe wave with the subsurface region.

20 Claims, 12 Drawing Sheets

(56) References Cited

U.S. PATENT DOCUMENTS 10,444,202 B2* 10/2019 Flynn et al. ....... G01N 29/2418
2015/0300995 A1* 10/2015 Flynn et al. ....... G01N 29/2418
73/602

OTHER PUBLICATIONS

Lévesque, et al., "Inspection of additive manufactured parts using laser ultrasonics," AIP Conference Proceedings (QNDE), 1706, 130003-1 - 130003-9 (Feb. 2016).

Lévesque, et al., "Performance of laser-ultrasonic F-SAFT imaging," *Ultrasonics,* 40(10):1057-1063 (Dec. 2002).

Nagy "Fatigue damage assessment by nonlinear ultrasonic materials characterization," *Ultrasonics,* 36(1-5):375-38 (Feb. 1998).

Ochiai, et al., "Detection and characterization of flaws in stainless steel by the laser-ultrasonic synthetic aperture focusing technique," *Materials Evaluation,* 62(4):450-459 (Apr. 2004).

Ohara, et al., "Imaging of closed cracks using nonlinear response of elastic waves at subharmonic frequency," *Applied Physics Letters,* 90, 011902-01 - 011902-03 (Jan. 2007).

Park, et al., "A high resolution approach for nonlinear sub-harmonic imaging," *NDT & E International,* 79:114-122 (Apr. 2016).

PSV-500-3D Scanning Vibrometer, https://www.polytec.com/us/vibrometry/products/full-field-vibrometers/psv-500 ..., 4 pages, downloaded Feb. 26, 2019.

Stratoudaki, et al., "Laser induced ultrasonic phased array using full matrix capture data acquisition and total focusing method," *Optics Express,* 24(19):21921-21938 (Sep. 19, 2016).

Swornowski, "Scanning of the Internal Structure Part With Laser Ultrasonic in Aviation Industry," *Scanning,* 33:378-385 (Oct. 2011).

Yamamoto, et al., "Application of laser interferometer to subharmonic phased array for crack evaluation (SPACE)," *Journal of the Japanese Society for Non-Destructive Inspection,* 57(4):198-203 (Jul. 10, 2008).

Yamamoto, et al., "Defect Detection in Thick Weld Structure Using Welding In-Process Laser Ultrasonic Testing System," *Materials Transactions,* 55(7):998-1002 (Apr. 18, 2014).

Zheng, et al., "Nonlinear acoustic applications for material characterization: A review," *Canadian Journal of Physics,* 77(12):927-967 (Mar. 2000).

* cited by examiner

THREE-DIMENSIONAL BROADBAND NONLINEAR PHASED ARRAY IMAGING

CROSS REFERENCE TO RELATED APPLICATION

This application claims the benefit of U.S. Provisional Pat. Application No. 62/924,463, filed Oct. 22, 2019, and is incorporated herein by reference.

ACKNOWLEDGMENT OF GOVERNMENT SUPPORT

This invention was made with government support under Contract No. 89233218CNA000001 awarded by the U.S. Department of Energy. The government has certain rights in the invention.

FIELD

The field is phased array imaging and non-destructive testing.

BACKGROUND

Nondestructive testing (NDT) of structures and mechanical parts is increasingly receiving attention as the need to monitor the health of aging infrastructure and quality controls on the manufacturing of mechanical parts is becoming more apparent. However, additional techniques for NDT or further improvements to existing NDT techniques are needed, particularly for providing improved detection, resolution, and imaging of subsurface defects including source regions associated with cracks and/or delaminations.

SUMMARY

Disclosed apparatus include 3D phased array systems configured to probe a subsurface volume of a sample and to image multiple response wave harmonics from a single probe wave wavelength and/or detect nonlinear defects in the subsurface volume. Methods disclosed can image multiple response wave harmonics from a single probe wave wavelength and/or detect nonlinear defects in the subsurface volume, using a 3D laser scanning vibrometer.

According to an aspect of the disclosed technology, systems can include an ultrasonic transducer configured to couple to a non-destructive testing (NDT) sample and configured to produce and direct an ultrasonic probe wave at a selected frequency into a subsurface region of the NDT sample, a 3D laser scanning vibrometer configured to direct a detection beam in a scan area on a surface of the NDT sample and to receive a return beam from the scan area, and to detect, based on the return beam, a 3D motion of the surface across a wideband frequency range, and a processor, and a memory configured with instructions that, when executed by the processor, cause the processor to produce sub-surface image data of the NDT sample at multiple harmonics of the selected frequency in the wideband frequency range based on the detected 3D surface motion, wherein the sub-surface image data describes a nonlinear defect response produced in the NDT sample by interaction of the ultrasonic probe wave with the subsurface region. In some examples, the instructions cause the processor to determine the presence of a closed portion of a crack based on the nonlinear defect response. For example, the instructions can cause the processor to determine the presence of the closed portion based on the sub-surface image data at a selected harmonic of the selected frequency. The instructions can also cause the processor to select a subset of the selected harmonic sub-surface image data based on a subset aperture of the scan area. In some examples, the multiple harmonics include sub-harmonics. In selected examples, the instructions cause the processor to compare the sub-surface image data with one or more nonlinear defect harmonic frequency signatures. In further examples, the ultrasonic transducer comprises at least one transducer element arranged on a wedge coupled to the NDT sample. In some examples, the ultrasonic transducer comprises an array of ultrasonic transducer elements. In further examples, the memory is configured with phased array processing algorithm instructions that cause the processor to produce the sub-surface image data. In particular examples, the phased array processing algorithm instructions include delay and sum algorithm instructions.

According to another aspect of the disclosed technology, methods include directing an ultrasonic probe wave at a selected frequency to a selected sub-surface region through a surface of a non-destructive testing (NDT) sample, detecting a 3D surface motion in a scan area at the surface of the NDT sample across a wideband frequency range with a 3D laser scanning vibrometer, and determining, based on the 3D surface motion, nonlinear response wave characteristics produced in the sub-surface region by an interaction with the ultrasonic probe wave, wherein the nonlinear response wave characteristics include multiple harmonics of the selected frequency. Some examples further include determining the presence or absence of a nonlinear defect in the sub-surface region based on the nonlinear response wave characteristics at the multiple harmonics. In some examples, the nonlinear defect includes a closed portion of a crack. In particular examples, the determining the presence or absence of the closed portion is based on the nonlinear response wave characteristics at a selected harmonic of the selected frequency. In further examples, the determining the presence or absence of the closed portion is based on a subset of the nonlinear response wave characteristics at the selected harmonic of the selected frequency corresponding to a subset aperture of the scan area. Some examples further include comparing nonlinear wave characteristics to harmonic signature characteristics associated with one or more nonlinear defect types, wherein the determining the presence or absence of the nonlinear defect is further based on the comparison. In some examples, the nonlinear response wave characteristics include longitudinal waves, shear waves, and Rayleigh waves. In selected examples, the directing an ultrasonic probe wave includes directing the ultrasonic probe wave using an array of transducer elements coupled to the surface of the NDT sample. In some examples, the 3D surface motion includes wave characteristics in the plane of the surface and perpendicularly out of the plane of the surface. In further examples, the determining the nonlinear response wave characteristics includes phased array processing the 3D surface motion with a delay and sum algorithm.

The foregoing and other objects, features, and advantages of the disclosed technology will become more apparent from the following detailed description, which proceeds with reference to the accompanying figures.

DETAILED DESCRIPTION

Non-Destructive Testing

Figure 1:
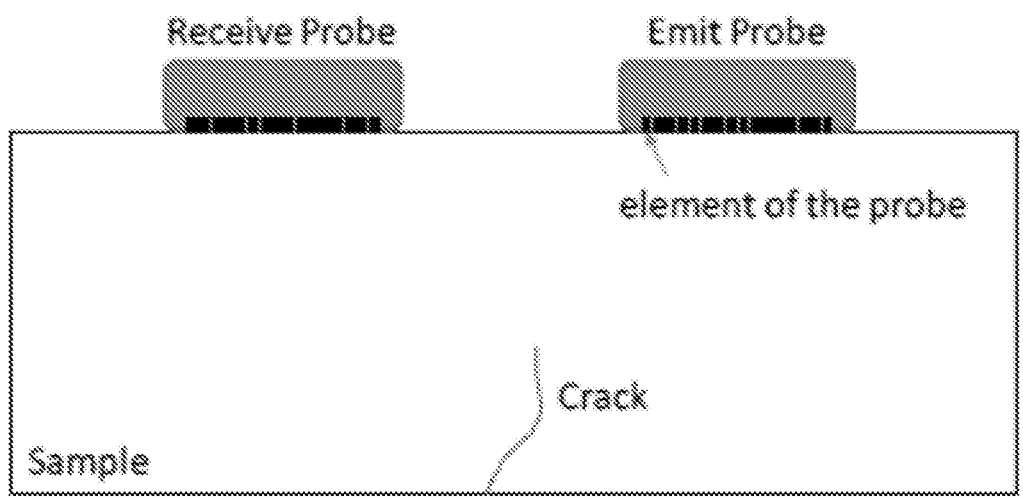
FIG. 1 is a side view schematic of an ultrasonic phased array NDT system.

Non-destructive testing (NDT) is defined as using various tools, such as ultrasonic (more generally referred to as elastodynamic), electromagnetic, or thermally based, to inspect the structural integrity of objects without damaging the object as a result of testing it. In the case of ultrasonic NDT techniques, a source transducer typically emits vibrational waves into a structure under test and various techniques are then used to detect signatures of damage.

Imaging defects in the depth of a material can be achieved using ultrasonic arrays of transducers (hardware) combined with phased-array processing (software). Ultrasonic arrays of transducers can be superior to single-element transducers when combined with suitable signal processing techniques, because they can include flexibility in the type of ultrasonic fields generated (e.g. plane waves, steered beams, and focused excitation) and can provide better imaging capabilities. An extensive review of this topic for NDT applications, including transducer materials and array geometries, is given by Drinkwater, B. W., and Wilcox, P. D. (2006). "Ultrasonic arrays for non-destructive evaluation: A review," NDT & E International 39, 525-541 (incorporated by reference herein), with a particular focus on the phased array technology. The operation of phased arrays is based on the use of appropriate time delays between the signals applied to or received from the individual transducers. When parabolic delays are used, ultrasonic waves can be focused to a specific point on a surface or in a bulk of a sample. This allows reaching relatively high amplitude levels at the focal point compared to what a single-element transducer can generate. In general, with the geometry and delay characteristics of the source transducer probes and signal detectors known, a sub-surface image of a sample can be formed using the detected reflections (e.g., corresponding to ultrasonic vibrational motion at a sample surface) of the source wave propagating through the sample. However, a phased array probe setup can have a number of limitations for imaging, including:

1) The transducer elements of the probe typically have a narrowband frequency response (working most efficiently around 1 frequency). This means that the received signals can be analyzed mostly around one frequency, leaving out some of the information contained in the other frequencies. This frequency can be the source frequency $f_0$ (the dominant frequency component of the emitted signal) for linear imaging; multiples of the source frequency (e.g., $2f_0$, $3f_0$, etc.) for nonlinear harmonic imaging, fractions of the source frequency (e.g., $f_0/2$, $3f_0/2$, etc.) for nonlinear subharmonic imaging. Harmonics are described in Ohara et al. (2007) "Imaging of closed cracks using nonlinear response of elastic waves at subharmonic frequency," Appl. Phys. Lett. 90, 011902, and in Park et al. (2016) "A high resolution approach for nonlinear sub-harmonic imaging," NDT&E International 79, 114, which are both incorporated herein by reference.

2) The number of elements (transducers) in a probe is limited (32, 64, 128, etc). The cost of the probe and data acquisition system increases rapidly with the number of elements in the probe.

3) The phased-array probe is usually designed for one type of wave only: Longitudinal (L) waves (which can be referred to as pressure (P) waves, typically with fluids such as liquid or air), Shear (S) waves, or Rayleigh (R) surface waves.

A schematic representation of a possible phased-array setup to image a crack in a sample is shown in FIG. 1. The emit probe can be operated at $f_0$ and send a plane wave in the direction of the region of interest (region with crack in this case). If the region of interest is linear and expected to scatter the incident field, then the receive probe can be operated at $f_0$ to detect the scattered field. Alternatively, the emit probe can also be used as a receive probe at $f_0$ in this case for the imaging. For nonlinear imaging (e.g., due to a defect acting as a nonlinear scatterer), the receive probe can be operated (or designed to operate) at $f_0/2$, $2f_0$, $3f_0$, etc.

Crack/Wave Interactions

Damaged materials can have in common the presence of internal defects of various sizes and types. Such defects can include dislocations, micro-cracks, relatively large cracks, and delaminations, by way of example, and can depend upon the material and/or the process leading to damage (e.g., impact, exposure to harsh chemical environment, fatigue, non-optimal settings in the manufacturing process, etc.). As an ultrasonic wave propagates in a solid, it interacts with its constituents, including its defects. Thus, ultrasonic waves have been used for decades to characterize materials and evaluate structural integrity of various materials. Many material defects can be associated with nonlinear effects produced during the propagation of finite-amplitude ultrasonic waves, such as wave distortions in the time domain or generation of harmonics in the frequency domain. Example associations are described in Zheng et al. (2000) "Nonlinear acoustic applications for material characterization: A review," Can. J. Phys. 77, 927-967, and in Nagy, P. (1998) "Fatigue damage assessment by nonlinear ultrasonic materials characterization," Ultrasonics 36, 375-38, which are each incorporated herein by reference. While many techniques rely upon and therefore only detect a linear scattering of a wave by a defect, nonlinear effects can be observed even when the wavelength of an incident wave (or its linear scattering) is much larger (by orders of magnitude) than the size or a characteristic dimension of the defects. This can be of practical importance for NDT applications because it can be used for the early detection of defects in materials, such as before a larger crack is formed or requires more substantial repairs to address. In fact, nonlinear signatures can be significantly more sensitive to the presence of microscopic-sized defects (see also Nagy et al. referenced hereinabove), which are precursors to larger defects and eventually system failure, than linear signatures, including linear scattering, changes in the propagation speed of the waves, and linear attenuation.

In practice, an incident ultrasonic wave can become distorted by an imperfect contact within an interface. For example, an incident monochromatic wave can be clipped at its peaks due to collisions between the two faces of the defect. The clipped waveform has the majority of its energy at the fundamental frequency of the incident wave but it also has a finite amount of energy at odd harmonic multiples of the fundamental frequency. Collisions that occur at any other time during the cycle of the fundamental frequency, or that occur for antisymmetric portions of the cycle, can result in finite amounts of energy at the even harmonic multiples of the fundamental frequency in addition to the odd harmonics. Two crack faces that are in constant contact, e.g. a closed crack, will rub against one another with a frictional interaction that may distort the incident wave throughout the cycle of the fundamental frequency. If the interface is driven at two frequencies, $f_1$, and $f_2$, then the nonlinearly generated frequency content will consist of summation and difference frequency combinations of the two frequencies, $nf_1 \pm mf_2$ (where n and m may be any integer values). In some cases, where there is not enough energy for one side of a crack to vibrate far enough to contact the other side of the crack for more than a period of the wave (i.e., trampoline effect), there is a potential for the creation of sub-harmonics $f_1/n$, $f_2/m$, where n and m are integer values (or $n_1 f_1/m_1$, $n_2 f_2/m_2$, where n1, m1, n2, m2 may be any integer values), such as $f_1/2$, $f_2/2$ and linear combinations thereof.

Representative Examples

Herein, examples of 3D phased array systems are disclosed having a flat frequency response over a wide frequency band. Measurements of multiple wave types are possible through simultaneous measurement of all three Cartesian components of a particle's motion on a surface of a sample. Also, a wideband response can allow for nonlinear imaging at any harmonic frequency of interest.

Figure 2:
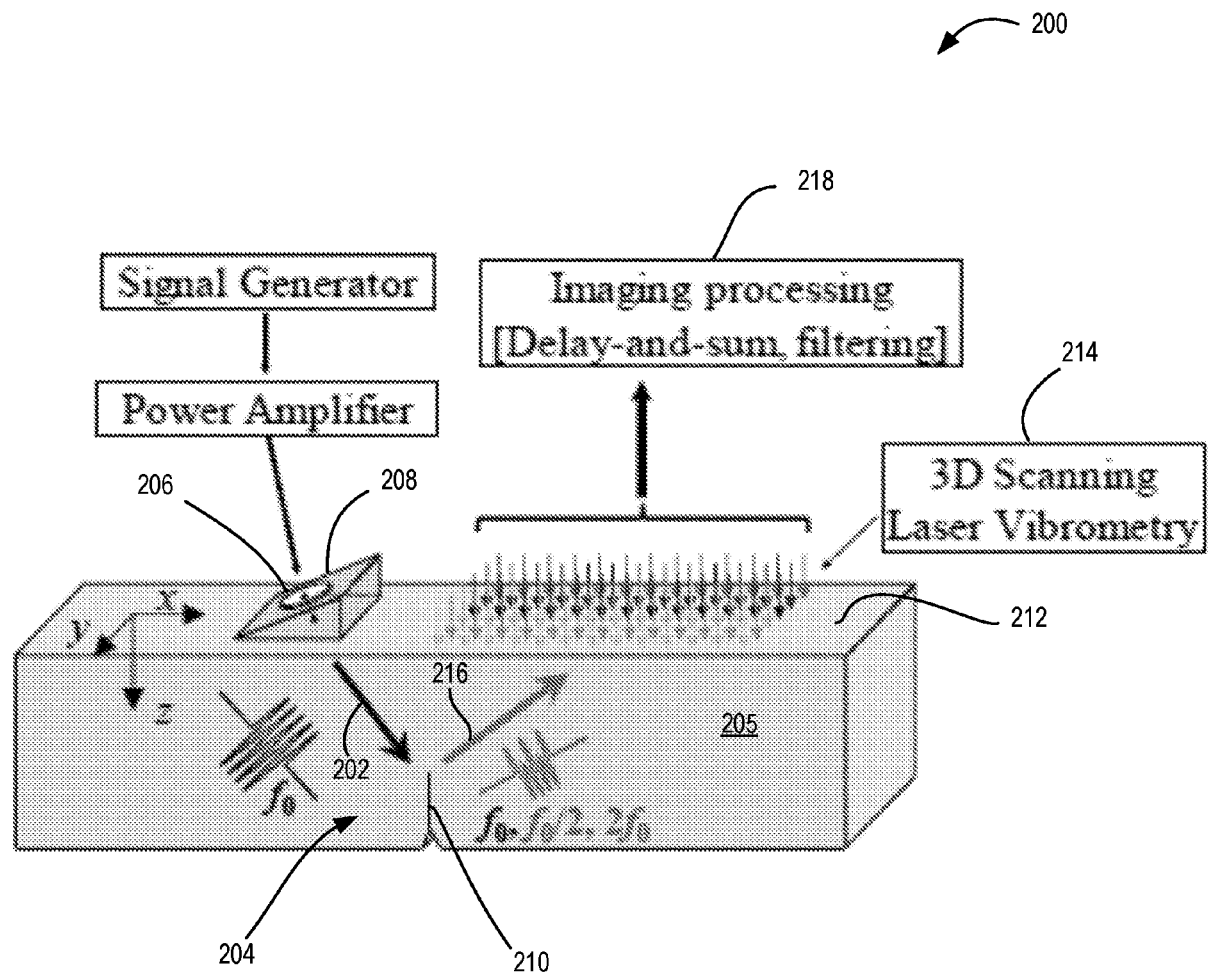
FIG. 2 is a perspective view schematic of an ultrasonic phased array NDT system using a 3D laser vibrometer for 3D wideband phased array imaging.

Referring to FIG. 2, in a representative example of an ultrasonic detection system 200, an incident plane wave 202 at a frequency $f_0$ is emitted towards a region of interest 204 of a sample 205. This can be achieved, for example, with a phased-array probe (such as that shown in FIG. 1) and appropriate delays between the elements of the probe, or with a single transducer 206 mounted on a wedge 208, with the wedge 208 forming an angle that produces an effect similar to that produced by the delays applied to the phased-array probe. In typical examples, the phased-array probe or transducer 206 is coupled to a power amplifier that amplifies a signal generated with a signal generator and directs the amplified signal to the phased-array probe or transducer. If a targeted defect 210 in the region of interest 204 is linear (e.g., open crack), the incident plane wave 202 will be scattered with frequency content $f_0$, only. If part or the full defect 210 is nonlinear, the incident plane wave 202 will be scattered with additional frequency content that could possibly include the harmonics $f_0/2$, $2f_0$, $3f_0$, etc. Also, as a result of the scattering, some mode conversion could happen, e.g., an incident P-wave could be scattered as a P-wave and an S-wave. On a surface 212 of the sample 205, a 3D laser Doppler vibrometer 214 is situated to detect and measure a vibrational response 216 from the interaction between the incident plane wave 202 and the targeted defect 210. 3D laser Doppler vibrometers can have a flat frequency response over a wide frequency band and can measure the three Cartesian components of the surface motion of the sample 205, thereby providing a complete wavefield on the surface 212 of the sample 205 that can be used in selected phased-array imaging techniques, e.g., carried out with an imaging processing device 218 such as a computing unit including one or more processors and memories configured with instructions to produce ultrasonic phased array images.

Figure 3:
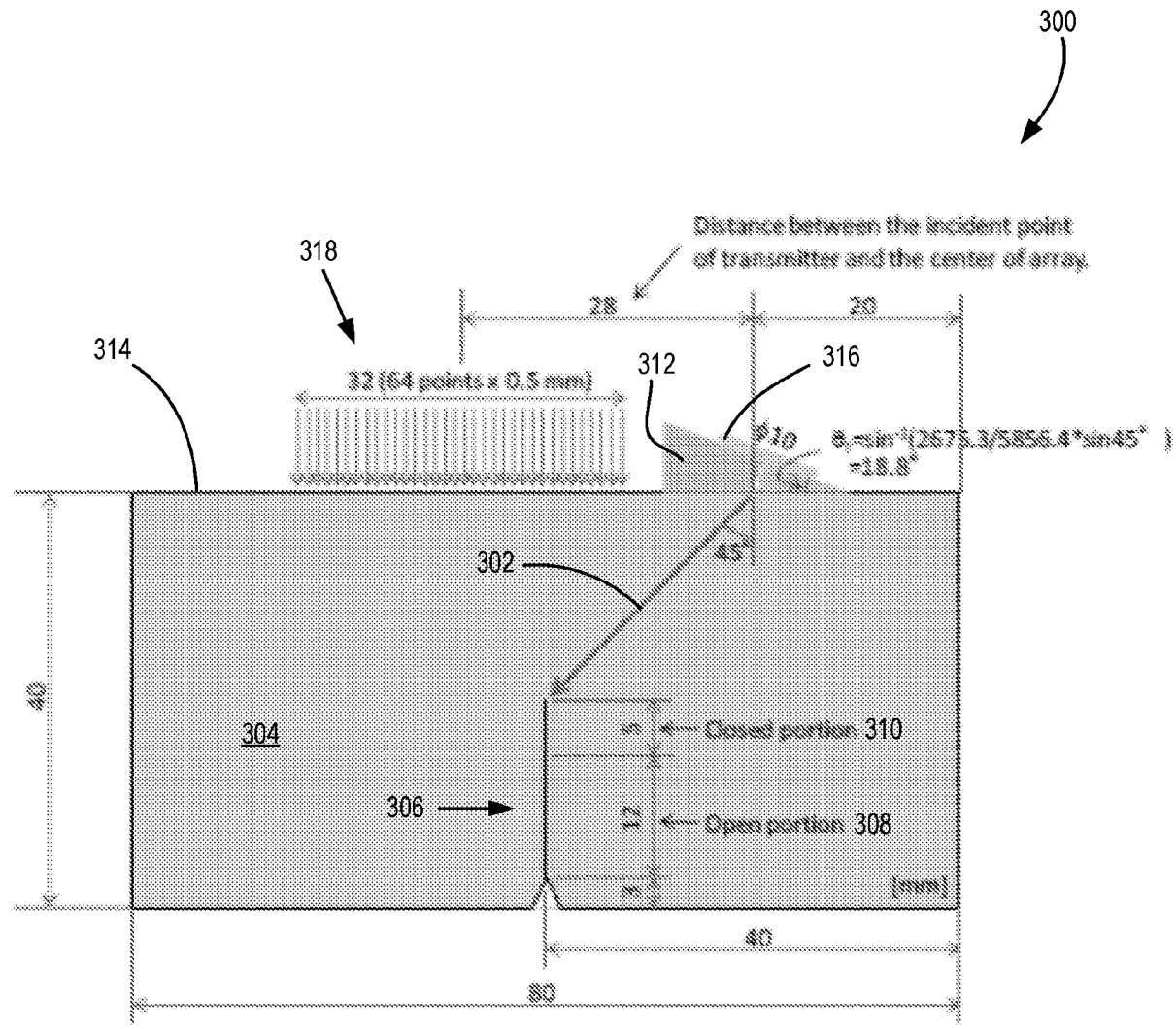
FIG. 3 is a side view schematic of an example phased-array imaging arrangement.
Figure 4:
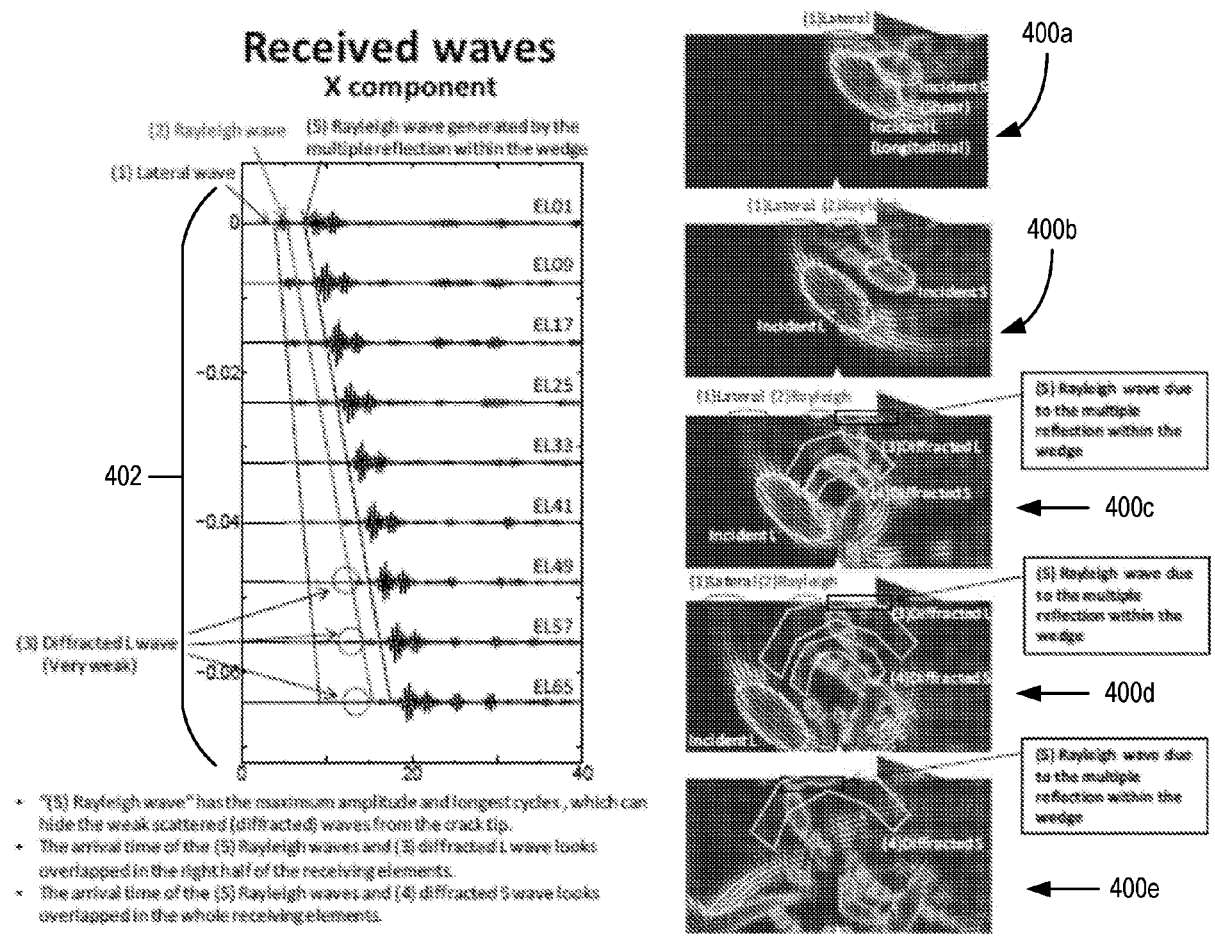
FIG. 4 shows the time-lapse results of a simulated wavefield emission and detection.

FIGS. 3-4 describe to an example numerical simulation of phased-array imaging using a finite-element method to describe, for the example simulated configuration 300 shown in FIG. 3, the propagation of a wave field 302 (such as an elastic pulsed wave) in a sample 304 and interaction with a crack 306 having an open portion 308 and a closed portion 310. Selected parameters for the simulated arrangement are shown in FIG. 3, including a position and angle of a wedge 312 coupled to a surface 314 of the sample 304, a transducer 316 coupled to the wedge 312, a scan grid 318 of surface scan points adjacent to the wedge 312, and a depth and position of the crack 306 including in relation to a surface 314. The scan grid 318 can also extend into the page of FIG. 3 so as to produce a 2-dimensional scan area. FIG. 4 shows snapshots 400a-400e of the wave field 302 in the sample 304 at various time steps, and shows signals 402 measured at various points of the scan grid 318. FIG. 4 illustrates the complexity of the wave field 302 in the sample 304 due to the multiple scattering occurring at the boundaries of the sample 302 and along the crack 306. In representative examples, the signals received on the surface 314 are used for the phased-array processing and imaging of the internal features (e.g., defects). As shown, an incident L-wave propagates through the medium and an incident S-wave follows due to scattering. As these waves interact with scattering elements, such as cracks or voids, diffracted L-waves form or diffracted S-waves with additional wave conversion.

FIGS. 5-10 show illustrative results following the simulation of the propagation of the wave field 302 in the sample 304 shown in FIGS. 3-4 where the simulated data recorded on the surface is used for phased-array processing. The source frequency $f_0$ generated by the transducer 316 for the simulation of the wave field 302 was 2 MHz. Detected surface motion is generally separated into an in-plane component of surface vibrational motion, e.g., in the plane of the surface 314 of the sample 304 as detected at the scan grid 318, and an out-of-plane component of surface vibrational motion, e.g., normal to the plane of the surface 314 as detected at the scan grid 318.

Figure 5:
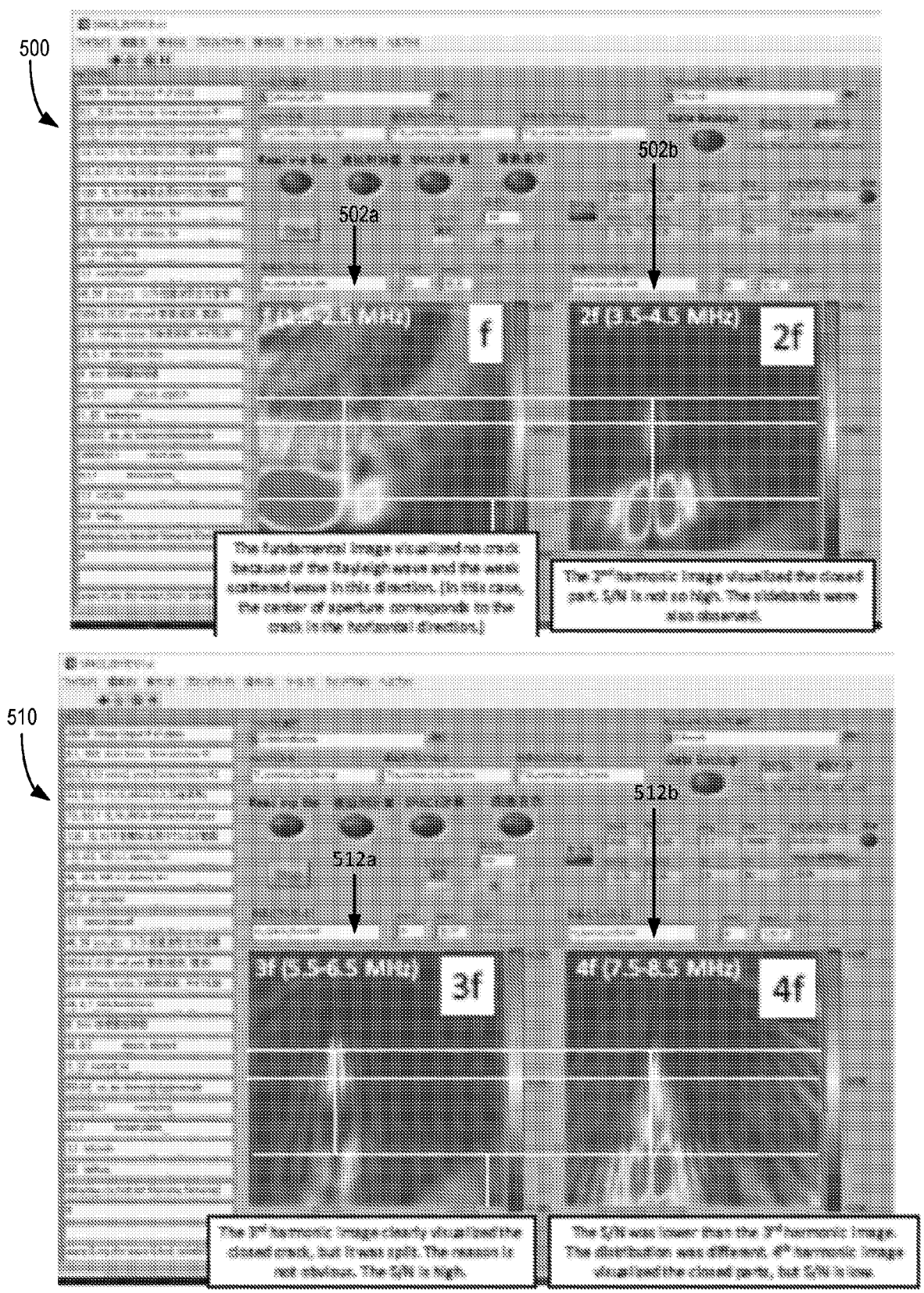
FIGS. 5-7 show display screenshots of phased array imaging at multiple frequencies for out-of-plane components of vibrational motion.
Figure 6:
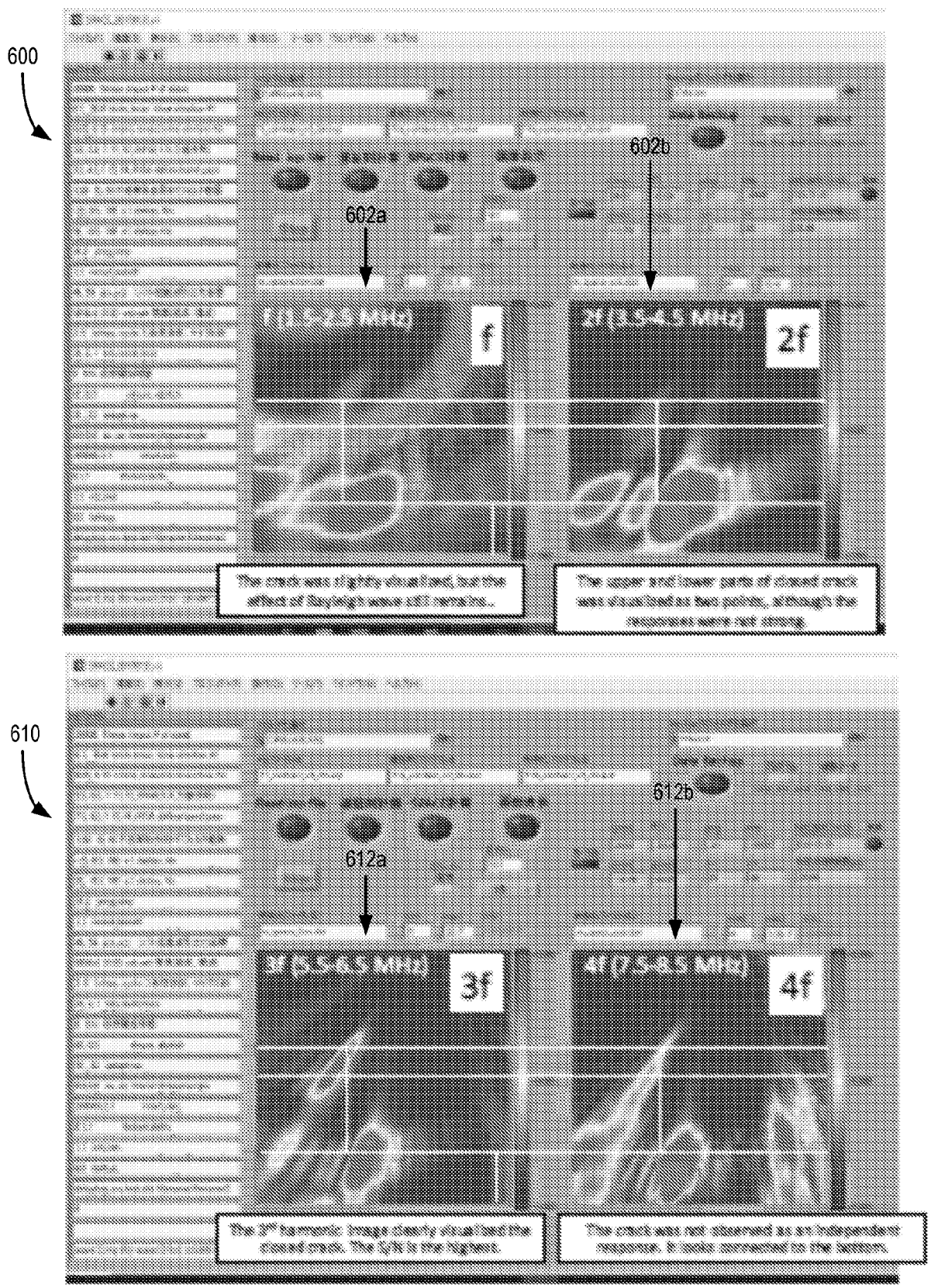
Figure 7:
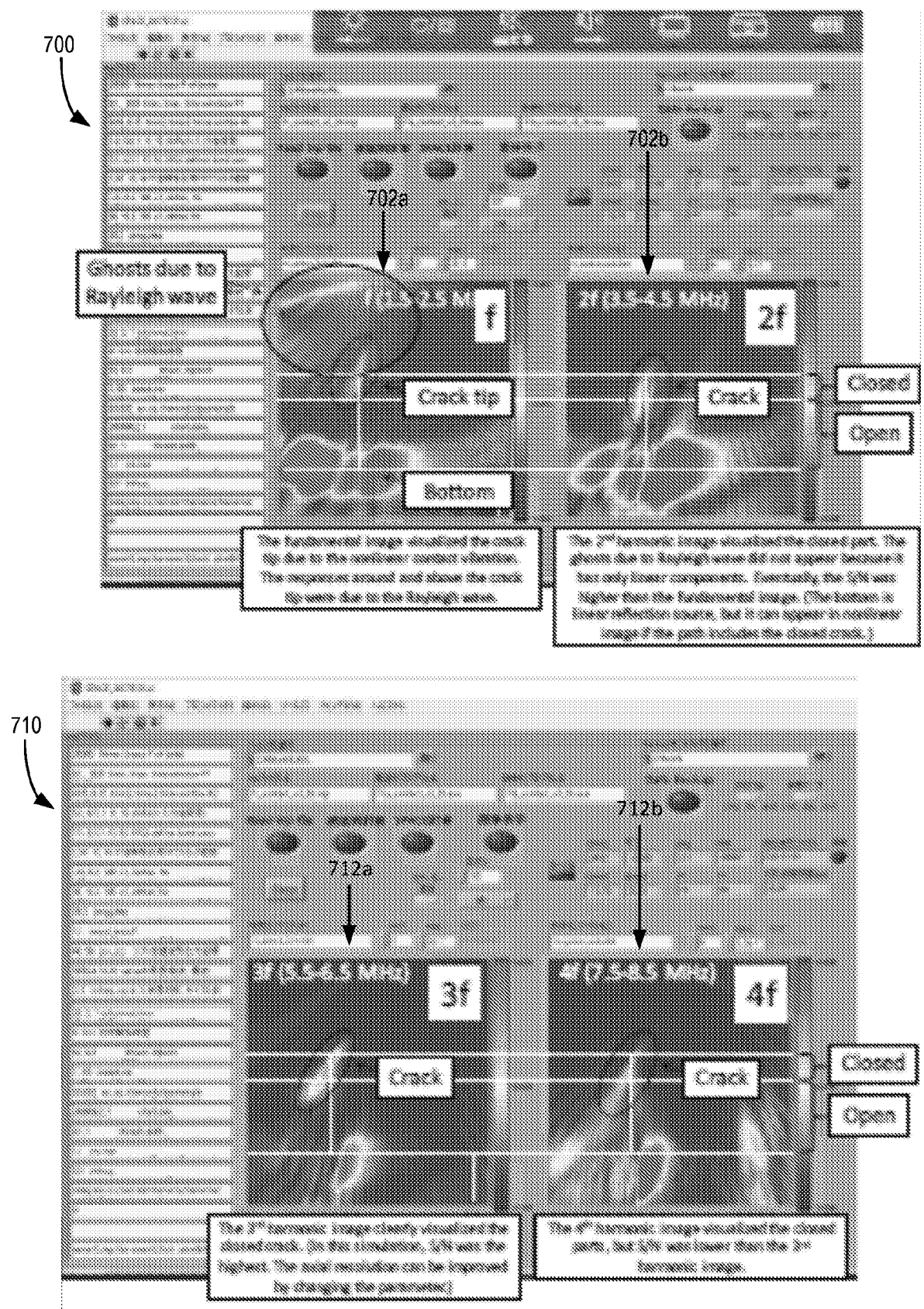

FIGS. 5-7 show screen captures 500, 510, 600, 610, 700, 710 for imaging of an out-of-plane component of surface vibrational motion for the simulated configuration 300. Screen captures 500, 510 show phased-array processing using the out-of-plane component of the vibration motion for a half aperture array at the surface 314, defined as 32 elements of the scan grid 318 that are closest to the transducer 316, with the transducer 316 operating as the source of the wave field 302. Screen captures 600, 610 show phased-array processing using the out-of-plane component of vibration motion for a half aperture array of 32 elements of the scan grid 318 that are farthest from the transducer 316. Screen captures 700, 710 show phased-array processing using the out-of-plane component of the vibration motion from a full aperture array of 64 elements (i.e., the full length of the scan grid 318). Data is processed using the out-of-plane component of the vibrational motion, at the source frequency $f_0$ and also at the harmonics $2f_0$, $3f_0$, and $4f_0$. Screen captures 500, 600, 700 shows sub-surface image slices at $f_0$ and $2f_0$, respectively, while screen captures 510, 610, 710 shows sub-surface image slices at $3f_0$ and $4f_0$, respectively.

As can be seen from an image slice 502a, imaging at the fundamental frequency $f_0$ did not produce a visualization of the crack 306 because the strength of the signal associated with the Rayleigh wave (or surface wave) and the weakness of the scattered wave. Because the 32 elements of the scan grid 318 closest to the transducer 316, at the 0.5 mm element spacing shown in FIG. 3 the center of the half-aperture is centered in the horizontal direction on the crack 306. As shown in an image slice 502b, at $2f_0$, the closed portion 310 of the crack 306 is partially visualized though the signal to noise ratio is sufficiently high and sidebands are also observed that can obscure the location of the crack 306. As can be seen from an image slice 512a, imaging at $3f_0$ produces clear visualizations of the closed portion 310 of the crack 306 at relatively high SNR. The visualization was split into two regions on opposite sides of the closed portion 310. The splitting of the $3f_0$ harmonic imaging into the two regions may be associated with directivity of scattered waves, but other mechanisms may be at work and provide additional clarification. As can be seen from an image slice 512b, imaging at $4f_0$ had a lower SNR than the SNR associated with the image slice 512a, but produced a visualization of the closed part 310 with a distribution different than the visualization in image slice 512a.

As can be seen from an image slice 602a at $f_0$, the crack 306 was visualized to some extent but the effect of the Rayleigh wave also obscured visualization. From an image slice 602b at $2f_0$, upper and lower parts of the closed portion 310 were visualized as two points though the response strength was not high. Similar to the half aperture imaging in 500, 510, an image slice 612a of $3f_0$ produced a clear visualization of the closed portion 310 of the crack 306 at a highest SNR. In an image slice 612b of $4f_0$, the crack 306 was not visualized as an independent response as it appears connected to a bottom of the sample 304. An image slice 702a of $f_0$ shows some visualization of the closed portion 310 of the crack 306 due to nonlinear contact vibration, with responses around and above the closed portion 310 being due to Rayleigh surface waves. An image slice 702b shows that visualization of the closed portion 310 can be obtained with the second harmonic $2f_0$, including without ghosting associated with linearly constrained components of Rayleigh waves, and with a higher SNR. In an image slice 712a, the imaging with the third harmonic $3f_0$ produces a clear visualization of the closed portion 310 of the crack 306 at a highest SNR. Additional axial resolution can be obtained by changing selected parameters. The fourth harmonic $4f_0$ shown in an image slice 712b also produces a visualization of the closed portion 310 though at a lower SNR than the SNR in the image slice 712a.

In general, from the above simulation based on the configuration 300 it can be seen that scanning over a wide area can be useful in examining the directivity and suitable aperture of a scanning array, such as a scan array of a 3D scanning vibrometer. Also, the broadband characteristic of the detection with the array can be used advantageously because a detected 3rd harmonic $3f_0$ associated with a plane wave directed into a sample can have a highest sensitivity in the identification of closed portions of subsurface cracks or other defects in the sample. For different defects, one or more other harmonic could be more sensitive than $3f_0$, and, based on the wideband response, a single experiment can be used to produce sufficient information about the subsurface response characteristics of the sample to compare against multiple crack types and defect signatures. As noted above, for the simulation of the configuration 300, a source frequency of 2 MHz was used, though it will be appreciated that smaller or higher source frequencies can be used in different examples. In selected examples, a higher spatial resolution can be obtained at a higher source frequency.

Figure 8:
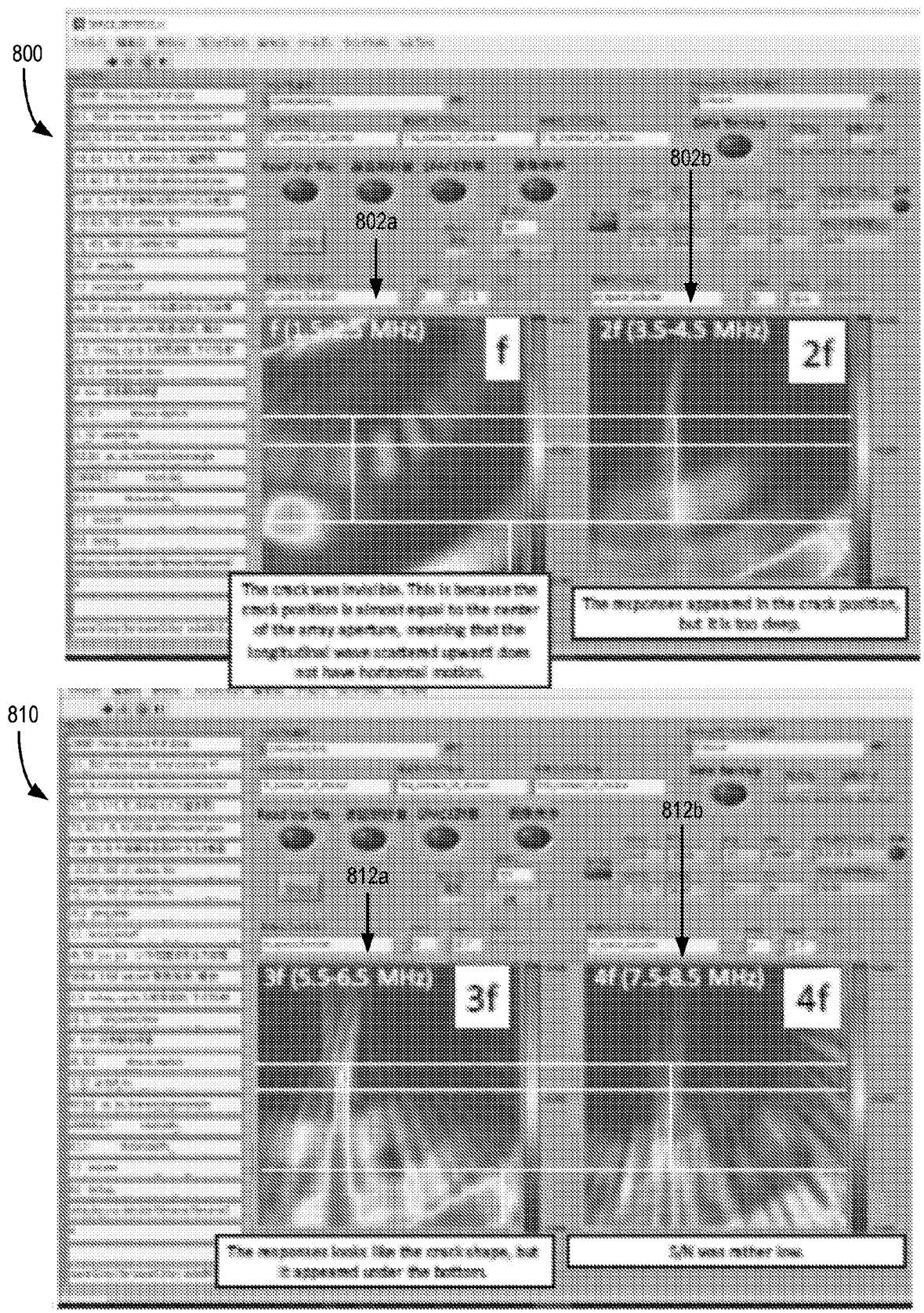
FIGS. 8-10 show display screenshots of phased array imaging at multiple frequencies for in-plane components of vibrational motion.
Figure 9:
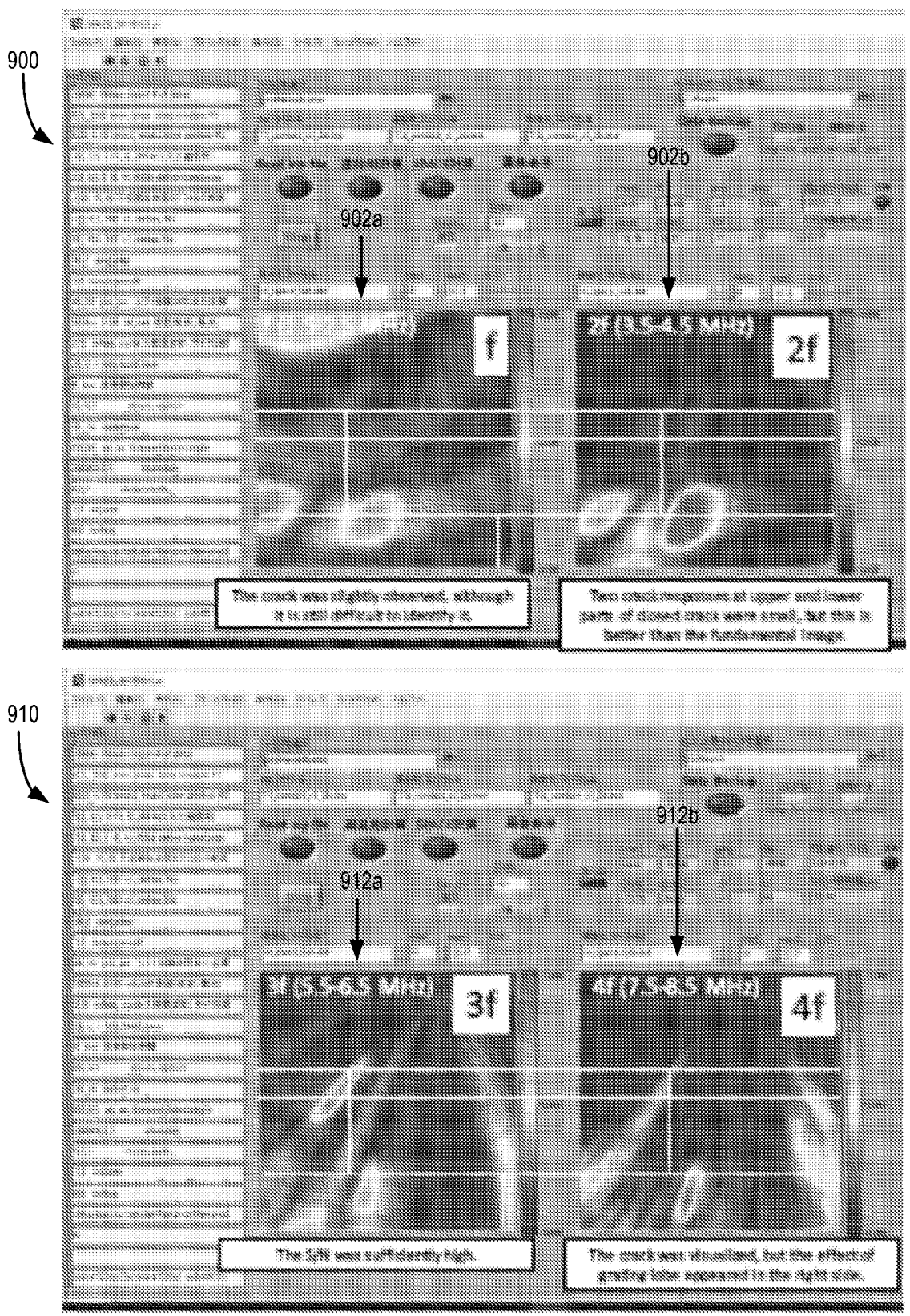
Figure 10:
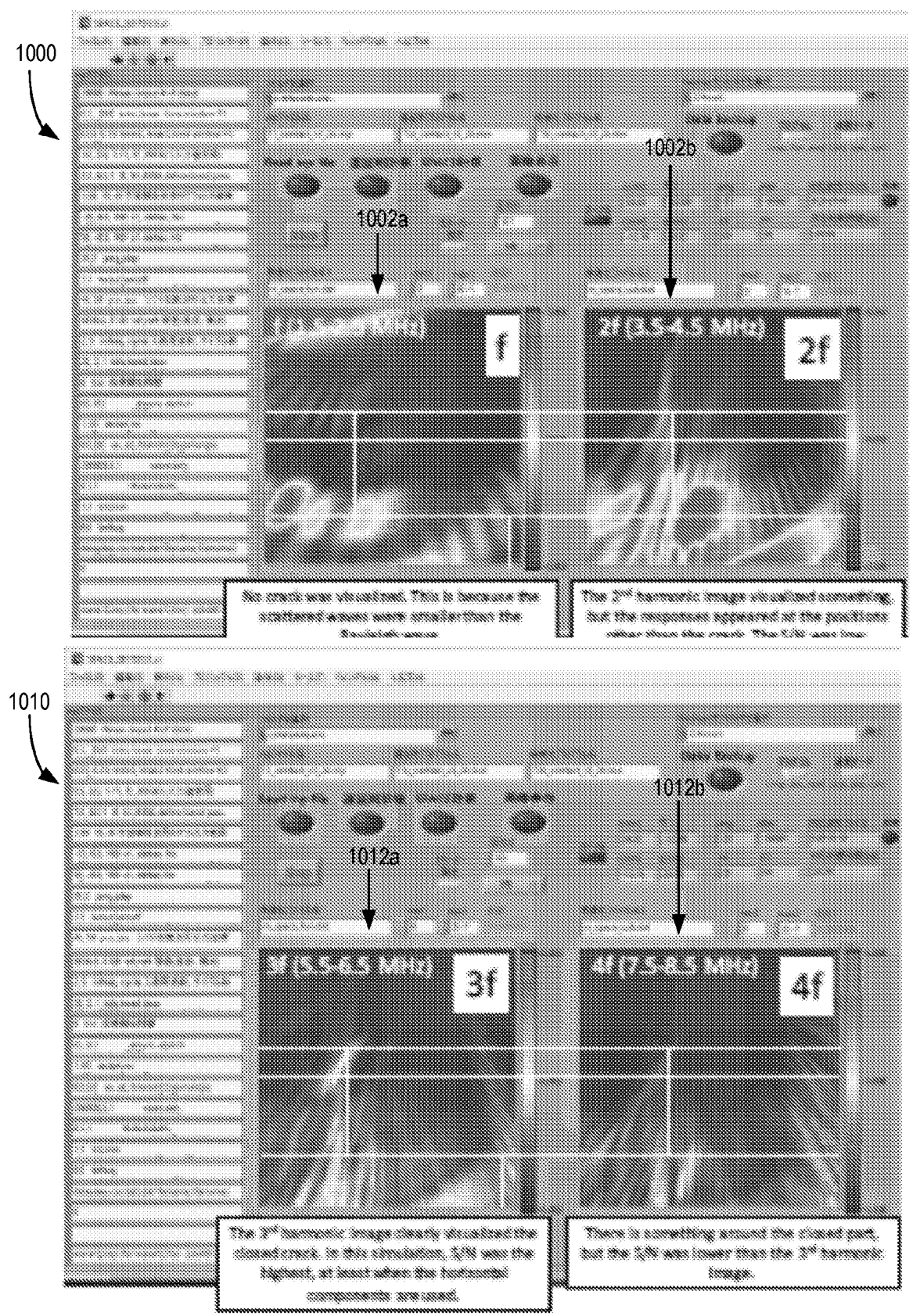

FIGS. 8-10 show screen captures 800, 810, 900, 910, 1000, 1010 for imaging of an in-plane component of surface vibrational motion for the simulated configuration 300. The screen captures 800, 810, 900, 910, 1000, 1010 are similar to the screen captures 500, 510, 600, 610, 700, 710 except for the replacement of out-of-plane with in-plane. An image slice 802a at $f_0$ shows that the crack 306 is not visible, and the invisibility is due to the position of the crack 306 at the center of the array aperture of the scan grid 318, resulting in a longitudinal wave scattered upwards without horizontal motion. The wave responses in an image slice 802b at $2f_0$ correspond to a position of the crack 306 over the surface 314, but not a depth associated with an origin or the closed portion 310. The visualization of the wave responses in an image slice 812a for $3f_0$ appear similar to the shape of the crack 306 though include an extension below a bottom surface of the sample 304. A $4f_0$ visualization shown in an image slice 812b had relatively low SNR but included some visualization of the crack 306. As shown in an image slice 902a, a wave response at $f_0$ for the more distance half-aperture of the scan grid 318 included only a slight observation of the crack 306. In an image slice 902b, a $2f_0$ response included some observable indicia at upper and lower portions of the closed portion 310 of the crack 306. Again, in an image slice 912a, a $3f_0$ response visualized the closed portion 310 with sufficiently high SNR. An image slice 912b for a $4f_0$ response produced a visualization of the crack 306 though a grating lobe effect appeared in a right side of the image slice 912b. For the full aperture of the scan grid 318, an image slice 1002a at $f_0$ does not produce a visualization of the crack 306 because the scattered waves were smaller than the Rayleigh surface wave. An image slice 1002b at $2f_0$ produced a visualization but a location of the visualization was different from the location of the crack. An image slice 1012a at $3f_0$ produced a clear visualization of the closer portion 310, and at a higher SNR at least when the in-plane components are used. An image slice 1012b at $4f_0$ shows some visualization around the closed portion 306 but the SNR was smaller than the SNR for the response in the image slice 1012a at $3f_0$.

In using the in-plane component of the vibrational motion, for purposes of the simulation, it can be assumed that shear waves, which travel at a different speed from the longitudinal waves used in out-of-plane component of the vibrational motion, are being used for the phased-array processing. In general, and similar to the out-of-plane motion simulated results, the images based on the 3rd harmonic $3f_0$ have a much higher SNR and provide a clearer picture of the crack 306 than the images based on the other harmonics $f_0$, $2f_0$, $4f_0$. Also, the image slice 912a for the half aperture (with the elements the farthest from the source) included a superior visualization of the crack 306 as compared to the image slice 1012a using the full aperture. Thus, in different examples, larger scan areas or omissions of selected scan areas during phased-array processing can produce improved position-dependent defect identification. In representative examples, by imaging the in-plane harmonics on the assumption of the incident longitudinal wave and scattered shear wave, an improved sharpness in the image of the crack 306 was obtained. Thus, with the wavelength of the shear wave being substantially smaller (factor of about ½) than that of the longitudinal wave, a higher imaging resolution can be obtained.

Figure 11:
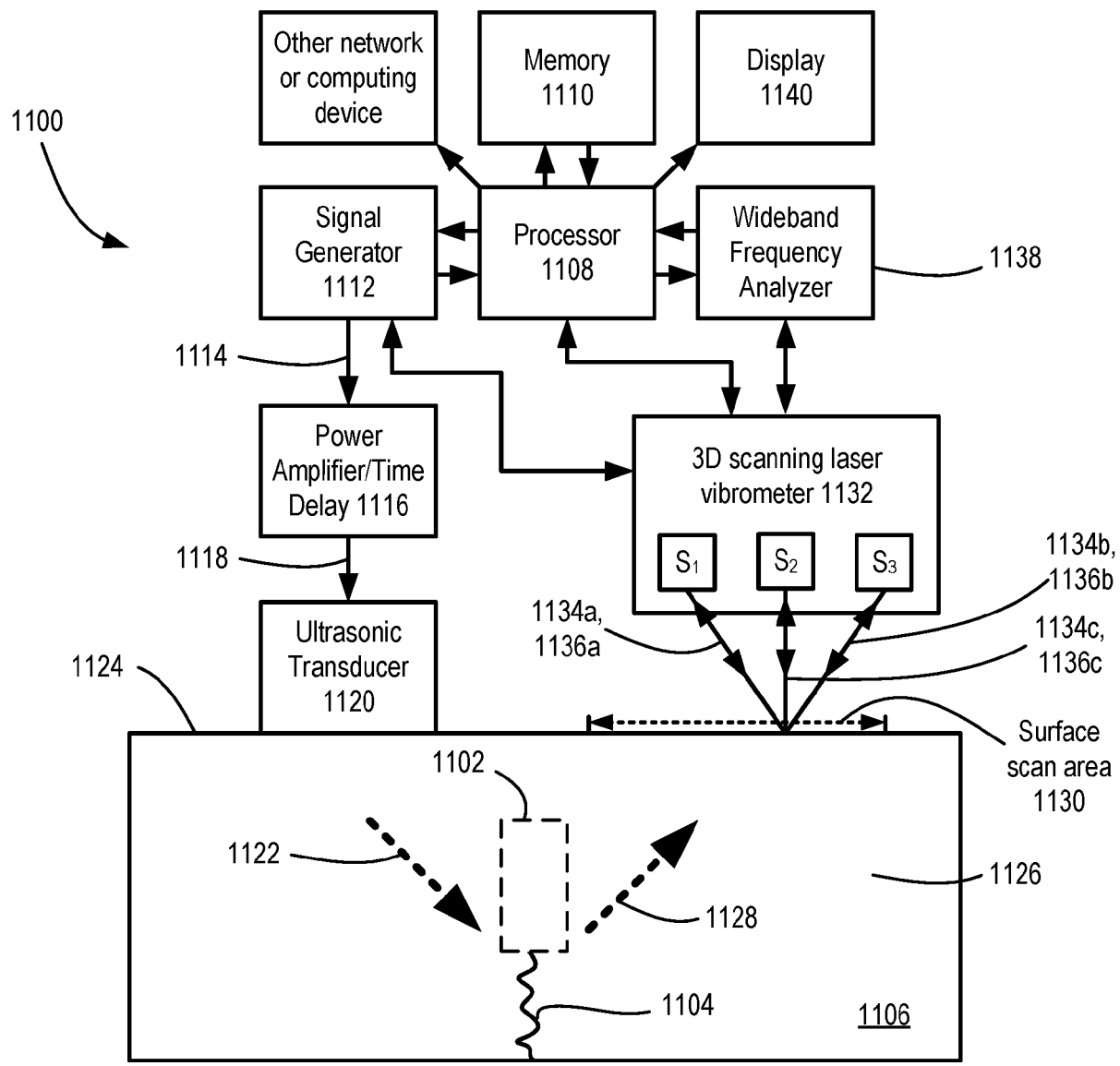
FIG. 11 is a side view schematic of an example phased-array NDT imager.

FIG. 11 shows an example NDT phased-array processing system 1100 that can be used, for example, to detect the locations of closed regions 1102 of sub-surface cracks 1104 (or even before the sub-surface cracks 1104 form) in a testing sample 1106 from a single test at a selected probe waveform frequency $f_0$. The system 1100 can include multiple components of a computing environment, including a processor 1108 or processing unit, and a memory 1110. Different sets of components can be coupled together (e.g., with a system bus) and form a computing device capable of carrying out phased array processing techniques and non-destructive testing.

In the aforementioned simulations, phased array processing techniques that were carried out include (1) frequency filtering to extract nonlinear components, (2) delay-and-sum processing of received waves, (3) calculation of root-mean-square (RMS) value of delay-and-summed waveform to obtain the intensity, (4) repetition of (1)-(3) for each pixel over an entire imaging area (region of interest), and (5) mapping the intensities to create an image. It will be appreciated in various examples other techniques and combinations can be performed. In selected examples, frequency filtering and nonlinear component extraction includes use of an FFT filter, though other filters may be suitable. In further examples, delay-and-sum processing was performed in the time domain, though selected examples can also be performed in the frequency domain (Frequency-domain beamforming). While root-mean-square (RMS) values of delay-and-summed waveform were calculated, some phased array examples can use the envelope of delay-and-summed waveform instead.

The memory 1110 can include various types, including volatile memory (e.g., registers, cache, RAM), non-volatile memory (e.g., ROM, EEPROM, flash memory, etc.), or a combination of volatile and non-volatile memory. The memory 1110 is generally accessible by the processor 1108 and can store software in the form computer-executable instructions that can be executed by the processor 1108 (or multiple processors) coupled to the memory 1110. Example computer-executable instructions can include instructions for phased array testing probe waveform generation, including waveform frequency, direction, sweep, focus, aperture, sequence, pattern, sample material characteristics (e.g., propagation velocity of the probe waveform through the material), test geometry, etc. Instructions can further include detection signal and data acquisition, phased array processing including defect positioning, and 2-D and/or 3-D subsurface imaging. Example processors can be configured based on RISC or CISC architectures, and can include one or more general purpose central processing units, application specific integrated circuits, graphics or coprocessing units or other processors, including processors suitable for phased array processing and matrix arithmetic. The memory 1110 can also include or be coupled to one or more storage devices, such as a hard disk drive to read from or write, a magnetic disk drive for reading from or writing to a removable magnetic disk, and an optical disk drive for reading from or writing to a removable optical disk (such as a CDROM or other optical media). Storage devices drives and associated computer-readable media can provide non-volatile storage of computer-readable instructions, data structures, program modules, and other data, and can be used, for example, to store pre-processing or post-processed phased-array imaging data. Other types of non-transitory computer-readable media which can store data that is accessible by a PC, such as magnetic cassettes, flash memory cards, digital video disks, CDs, DVDs, RAMs, ROMs, and the like, may also be used. The storage can be removable or non-removable and can be used to store information in a non-transitory way and which can be accessed within the phased-array processing system 1100.

The system 1100 can include a signal generator 1112 coupled to the processor 1108 and configured to generate an ultrasonic waveform signal 1114, typically in the form of a pulse of oscillations at a selected frequency $f_0$. A power amplifier 1116 can receive and amplify and/or provide one or more time delays to the signal 1114 to produce a transducer signal 1118. An ultrasonic transducer 1120, which can include one or more transducers or transducer elements, is coupled to a surface 1124 of the NDT sample. The ultrasonic transducer 1120 receives the transducer signal 1118 and produces and directs an ultrasonic probe waveform 1122 into the testing sample 1106. In some examples, the ultrasonic probe waveform 1122 is directed with time delays applied to a plurality of transducer array elements of the transducer 1120 to form an angled plane wave, or a focused waveform through beamforming delays. Some examples can include an angled or wedged structure coupling the transducer 1120 to the surface 1124 of the testing sample 1106, and can further include a single transducer element. In further examples, the ultrasonic transducer 1120 is coupled to the surface 1124 (and/or wedge) with a couplant. Various transducers can be used, including EMAT or piezoelectric, by way of example. The ultrasonic probe waveform 1122 interacts (e.g., through diffraction, scatter, reflection, etc.) with the bulk sub-surface material 1126 of the testing sample 1106 and forms a return waveform 1128.

The return waveform 1128 causes a vibrational motion at a portion of the surface 1124 in a scan area 1130 of a 3D scanning laser Doppler vibrometer 1132. The vibrometer 1132 can include a plurality of laser scan units $S_1$-$S_3$ associated with detecting three-dimensional motion of the surface 1124 in the scan area 1130, e.g., motion in the plane of the scan area 1130 and vertical motion perpendicular, or out of plane, from the surface 1124. Each of the scan units of the vibrometer 1132 typically directs detection beams 1134a-1134c to a selected location of the scan area 1130 and receives reflected portions 1136a-1136c of the detection beam (e.g., through a retroreflective material applied to the surface 1124 in the scan area 130). The reflected portions 1136a-1136c are used to determine a 3D motion of the surface 1124 across a wideband frequency range, such as through heterodyne comparison of the reflected portions 1136a-1136c with one or more reference beams. The vibrometer 1132 scans through a portion of or the entire scan area 1130 as one or more of the pulses of the ultrasonic probe waveform 1122 produce the return waveform 1128. For example, a pulse of the detection beams 1134a-1134c is directed to a scan point in the scan area 1130, and the vibrational response in the form of the received reflected portions 1136a-1136c on that surface of the pulse's interaction with the sub-surface material 1126 is recorded until the signal of the received reflected portions 1136a-1136c completely attenuates. After the signal has attenuated sufficiently, a subsequent laser pulse is directed to the next scan point of the grid in the scan area 1130 (e.g., by translating the laser beam). To ensure that the signal is sufficiently attenuated between scan points, a sufficient time between each recording can be provided, and the series of pulses (including suitable pulse-to-pulse delay) can be automated with user-defined parameters.

In representative examples, the signal generator 1112 and/or processor 1108 are in communication with the vibrometer 1132 such that the arrival of the return waveform 1128 can be synchronized to the scanning of the detection beams 1134a-1134c. The detected return waveform 1128 can also be processed through delay-and-sum beamforming algorithms to produce sub-surface images and defect localizations, including at different harmonics of the frequency $f_0$ of the probe waveform 1122, and with different apertures that can be associated with detection of different nonlinear defects. Various delay and sum beamforming techniques in phased array processing can be used, and are described in the art. Suitable delay and sum beamforming techniques typically include receiving similar waveforms along different paths with different delays and phases, shifting of the detected signals of a selected waveform by a runtime difference associated with the selected waveform (e.g., a particular L-wave) such that all channels of the detected signals of the selected waveform are in phase (and other non-selected waveforms are out of phase), and summing and normalizing the sum of the shifted signals by the number of detected signals. An RMS or maximum value can be calculated from the normalized sum and be used to form a visualization.

In some examples, a spectrum analyzer 1138 can receive surface 3D motion data from the vibrometer 1132 or the processor 1108 and determine a frequency response of the detected 3D motion. The frequency response can be compared with frequency profiles associated with different crack types, including harmonic signatures (such as $3f_0$ specific signatures, mode conversion signatures transferring one wave linear wave type to a nonlinear wave type, etc.) associated with closed regions 1102 of sub-surface cracks 1104. Analog and/or digital signal filters can also be used in the vibrometer 1132 or as a separate components of the system 1100, or stored in the memory 1110, to filter and/or apodize 3D motion data detected with the vibrometer 1132. A display 1140 can also be coupled to the processor 1108 to show graphical images, such as cross-sectional slices of the sample 1106 showing detected sub-surface features based on the analysis of the detected return waveform 1128 at different harmonics of the frequency of the probe waveform 1122.

Figure 12:
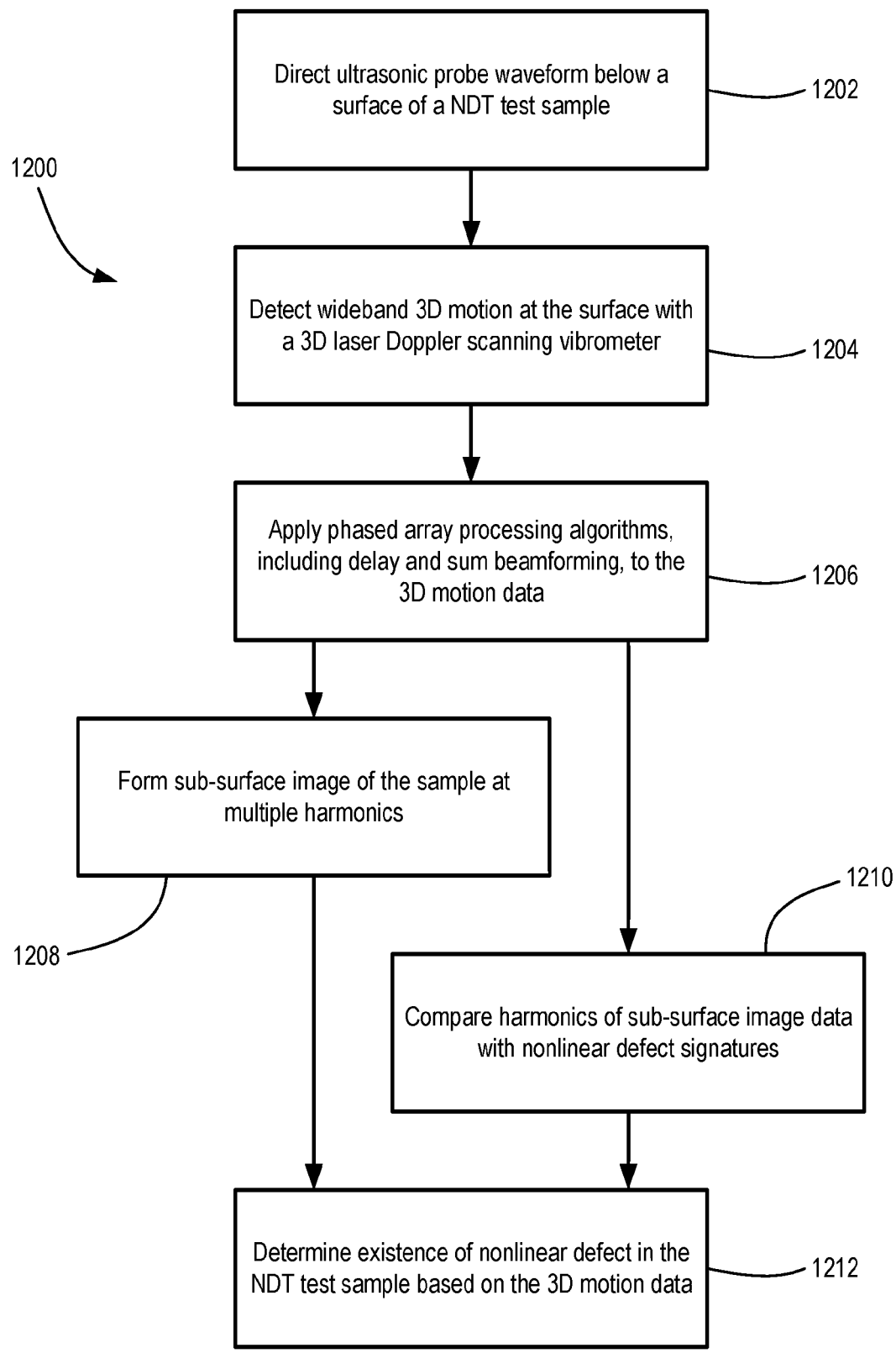
FIG. 12 is a flowchart of a method of nonlinear defect imaging for non-destructive testing.

FIG. 12 shows an example method 1200 that includes, at 1202, directing a probe waveform below a surface of an NDT test sample. At 1204, a three-dimensional motion at the surface of the sample is detected across a wideband range of frequencies using a 3D laser Doppler vibrometer. At 1206, phased array processing techniques, such as delay and sum beamforming, are applied to the 3D motion data. In some examples, at 1208, a sub-surface image of the test sample can be formed including at multiple harmonics of a frequency $f_0$ of the probe waveform, and the multiple harmonics can also correspond to multiple different types of response waves, including nonlinear response waves. For example, a harmonic (or non-harmonic) frequency of interest can be selected, and the wave response information can be computed from the 3D motion data and an image and/or visualization, such as one or more cross-sectional slices of the NDT test sample, can be displayed that indicate defect sources. Some examples can provide volumetric nonlinear images using a plurality of cross-sectional slices, e.g., forming 3D images of sub-surface volumes and associated vibrational response characteristics, including sub-surface mapping of fine defects. In some examples, a frequency response of the sub-surface image or 3D motion data, or the presence or absence of selected harmonics of $f_0$ in the data, are compared with nonlinear defect signatures, such as with a look-up table of frequency response profiles. At 1212, an existence or absence of nonlinear defect, such as a closed portion of a crack, is determined for the NDT test sample based on the 3D motion data, images, and/or nonlinear defect signature. In representative examples, multiple response frequencies, and multiple wave types, are detected simultaneously with a wideband 3D laser scanning vibrometer using a single wavelength probe waveform. The multiple response frequencies, which can correspond to a complete picture or understanding of a sub-surface volume of an NDT test sample, can be used to identify various nonlinear defects in the NDT test sample without requiring additional tests at separate probe wavelengths.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

Surfaces are described in various embodiments and depicted as flat. However, in some examples, surfaces may be curved and/or discontinuous. Herein, various signals are described and can be provided with various communication paths, including with point-to-point wired paths as well as wirelessly, and also through various topologies, such as serially, parallel, or ring connections. Signals can be provided through conductive electronics, optical interconnects, or at radio or other frequencies, as convenient. Signals can correspond to a time-varying amplitude and/or frequency of electromagnetic and/or acoustic waves. Ultrasonic generally refers to sound waves at frequencies ranging from about 20 kHz and higher, such as up to about 2 GHz, 20 GHz, etc. Wideband refers to detection frequencies in the range of about 0 Hz to about 20 MHz, etc. Transducers used to generate ultrasonic frequencies are typically narrowband where the range of frequencies around a center frequency is generally a small range relative to the value of the center frequency (e.g., ± 1%, 5%, 10%, etc.). Examples of nonlinear defects are described, including cracks, and closed portions of cracks. Defects refer to cracks, discontinuities, voids, contaminants, and other abnormalities in a sample medium. Nonlinear defects are defects that produce a wave response at a frequency different, typically at one or more harmonics or sub-harmonics, from a center frequency of a probe wave. Defect sizes associated with nonlinear responses can be on the order of 0.1 µm to 1 mm, by way of example. Waves and wave characteristics are also described, and generally refers to amplitude, frequency, direction, wave-type, etc., including changes over time and space.

Nonlinear response wave construction, defect localization, and phased array processing algorithms may be, for example, embodied as software or firmware instructions carried out by a digital computer. For instance, any of the disclosed techniques can be performed by a computer or other computing hardware (e.g., an ASIC or FPGA) that is part of a NDT system. The NDT system can be connected to or otherwise in communication with 3D laser Doppler scanning vibrometer and be programmed or configured to receive 3D surface motion vibrational data from the vibrometer and perform the desired wave computations (e.g., any of the phased array processing techniques disclosed herein). The computer can be a computer system comprising one or more processors (processing devices) and tangible, non-transitory computer-readable media (e.g., one or more optical media discs, volatile memory devices (such as DRAM or SRAM), or nonvolatile memory or storage devices (such as hard drives, NVRAM, and solid state drives (e.g., Flash drives)). The one or more processors can execute computer-executable instructions stored on one or more of the tangible, non-transitory computer-readable media, and thereby perform any of the disclosed techniques. For instance, software for performing any of the disclosed embodiments can be stored on the one or more volatile, non-transitory computer-readable media as computer-executable instructions, which when executed by the one or more processors, cause the one or more processors to perform any of the disclosed techniques for nonlinear response wave reconstruction. The results of the computations can be stored (e.g., in a suitable data structure or lookup table) in the one or more tangible, non-transitory computer-readable storage media and/or can also be output to the user, for example, by displaying, on a display device, cross-sectional image slices of a sub-surface volume of an NDT sample with a graphical user interface. In particular examples, NDT images based on multiple harmonics that identify nonlinear sub-surface defects (e.g., closed portions of sub-surface cracks) are displayed on a display device.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any one example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. A system, comprising:
   an ultrasonic transducer configured to couple to a non-destructive testing (NDT) sample and configured to produce and direct an ultrasonic probe wave at a selected frequency into a subsurface region of the NDT sample;
   a 3D laser scanning vibrometer configured to direct a detection beam in a scan area on a surface of the NDT sample and to receive a return beam from the scan area, and to detect, based on the return beam, a 3D motion of the surface across a wideband frequency range; and
   a processor, and a memory configured with instructions that, when executed by the processor, cause the processor to produce sub-surface image data of the NDT sample at multiple harmonics of the selected frequency in the wideband frequency range based on the detected 3D surface motion, wherein the sub-surface image data describes a nonlinear defect response produced in the NDT sample by interaction of the ultrasonic probe wave with the sub-surface region.

2. The system of claim 1, wherein the instructions cause the processor to determine the presence of a closed portion of a crack based on the nonlinear defect response.

3. The system of claim 2, wherein the instructions cause the processor to determine the presence of the closed portion based on the sub-surface image data at a selected harmonic of the selected frequency.

4. The system of claim 3, wherein the instructions cause the processor to select a subset of the selected harmonic sub-surface image data based on a subset aperture of the scan area.

5. The system of claim 1, wherein the multiple harmonics include subharmonics.

6. The system of claim 1, wherein the instructions cause the processor to compare the sub-surface image data with one or more nonlinear defect harmonic frequency signatures.

7. The system of claim 1, wherein the ultrasonic transducer comprises at least one transducer element arranged on a wedge coupled to the NDT sample.

8. The system of claim 1, wherein the ultrasonic transducer comprises an array of ultrasonic transducer elements.

9. The system of claim 1, wherein the memory is configured with phased array processing algorithm instructions that cause the processor to produce the sub-surface image data.

10. The system of claim 9, wherein the phased array processing algorithm instructions include delay and sum algorithm instructions.

11. A method, comprising:
    directing an ultrasonic probe wave at a selected frequency to a selected sub-surface region through a surface of a non-destructive testing (NDT) sample;

detecting a 3D surface motion in a scan area at the surface of the NDT sample across a wideband frequency range with a 3D laser scanning vibrometer; and determining, based on the 3D surface motion, nonlinear response wave characteristics produced in the sub-surface region by an interaction with the ultrasonic probe wave, wherein the nonlinear response wave characteristics include multiple harmonics of the selected frequency.

12. The method of claim 11, further comprising determining the presence or absence of a nonlinear defect in the sub-surface region based on the nonlinear response wave characteristics at the multiple harmonics.

13. The method of claim 12, wherein the nonlinear defect includes a closed portion of a crack.

14. The method of claim 13, wherein the determining the presence or absence of the closed portion is based on the nonlinear response wave characteristics at a selected harmonic of the selected frequency.

15. The method of claim 14, wherein the determining the presence or absence of the closed portion is based on a subset of the nonlinear response wave characteristics at the selected harmonic of the selected frequency corresponding to a subset aperture of the scan area.

16. The method of claim 12, further comprising comparing nonlinear wave characteristics to harmonic signature characteristics associated with one or more nonlinear defect types, wherein the determining the presence or absence of the nonlinear defect is further based on the comparison.

17. The method of claim 11, wherein the nonlinear response wave characteristics include longitudinal waves, shear waves, and Rayleigh waves.

18. The method of claim 11, wherein the directing an ultrasonic probe wave includes directing the ultrasonic probe wave using an array of transducer elements coupled to the surface of the NDT sample.

19. The method of claim 11, wherein the 3D surface motion includes wave characteristics in the plane of the surface and perpendicularly out of the plane of the surface.

20. The method of claim 19, wherein the determining the nonlinear response wave characteristics includes phased array processing the 3D surface motion with a delay and sum algorithm.

* * * * *